G. B. HALL.
PALMETTO PLOW.
APPLICATION FILED JAN. 4, 1918.
1,283,746.
Patented Nov. 5, 1918.
3 SHEETS—SHEET 1.
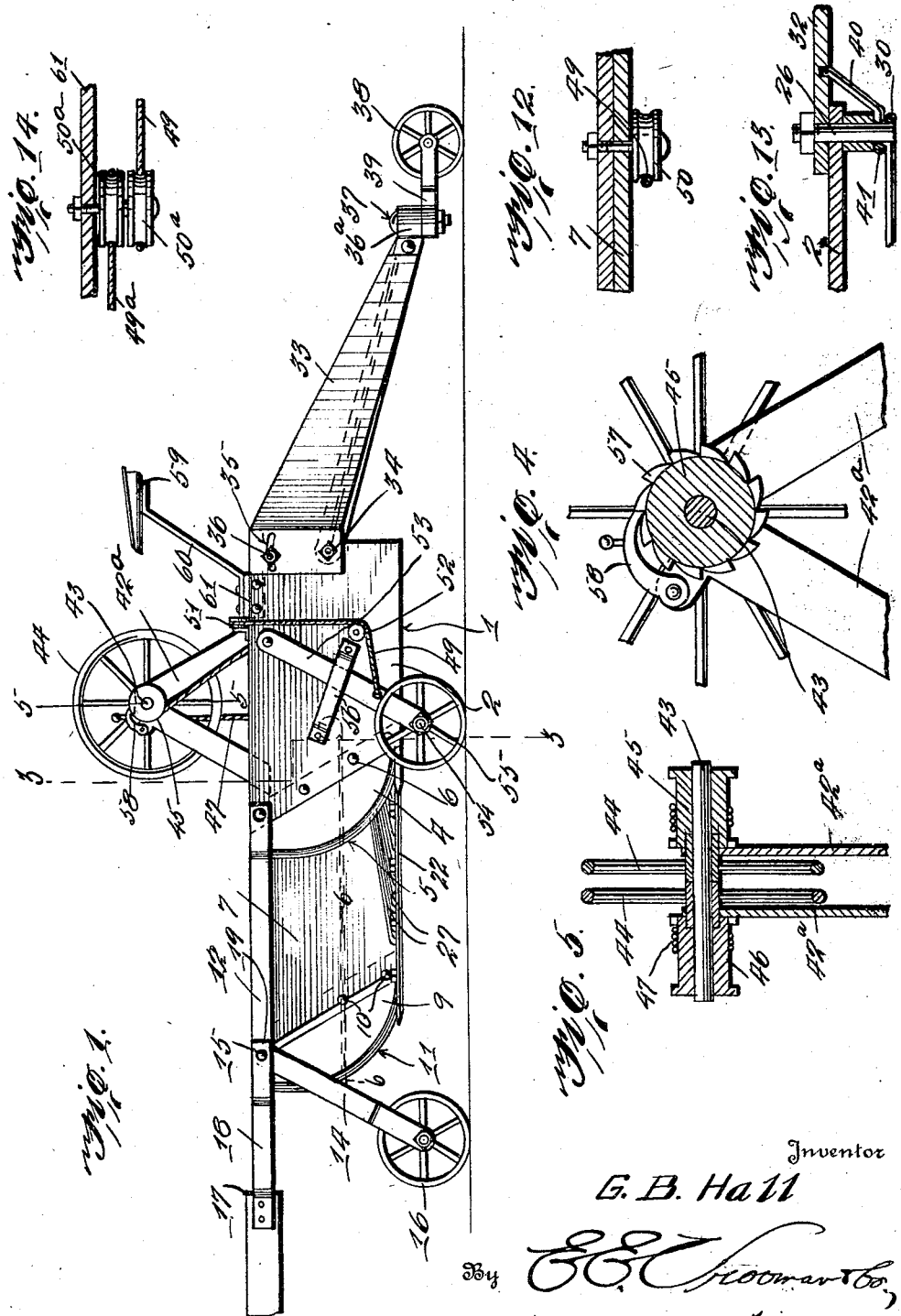
Inventor
G. B. Hall

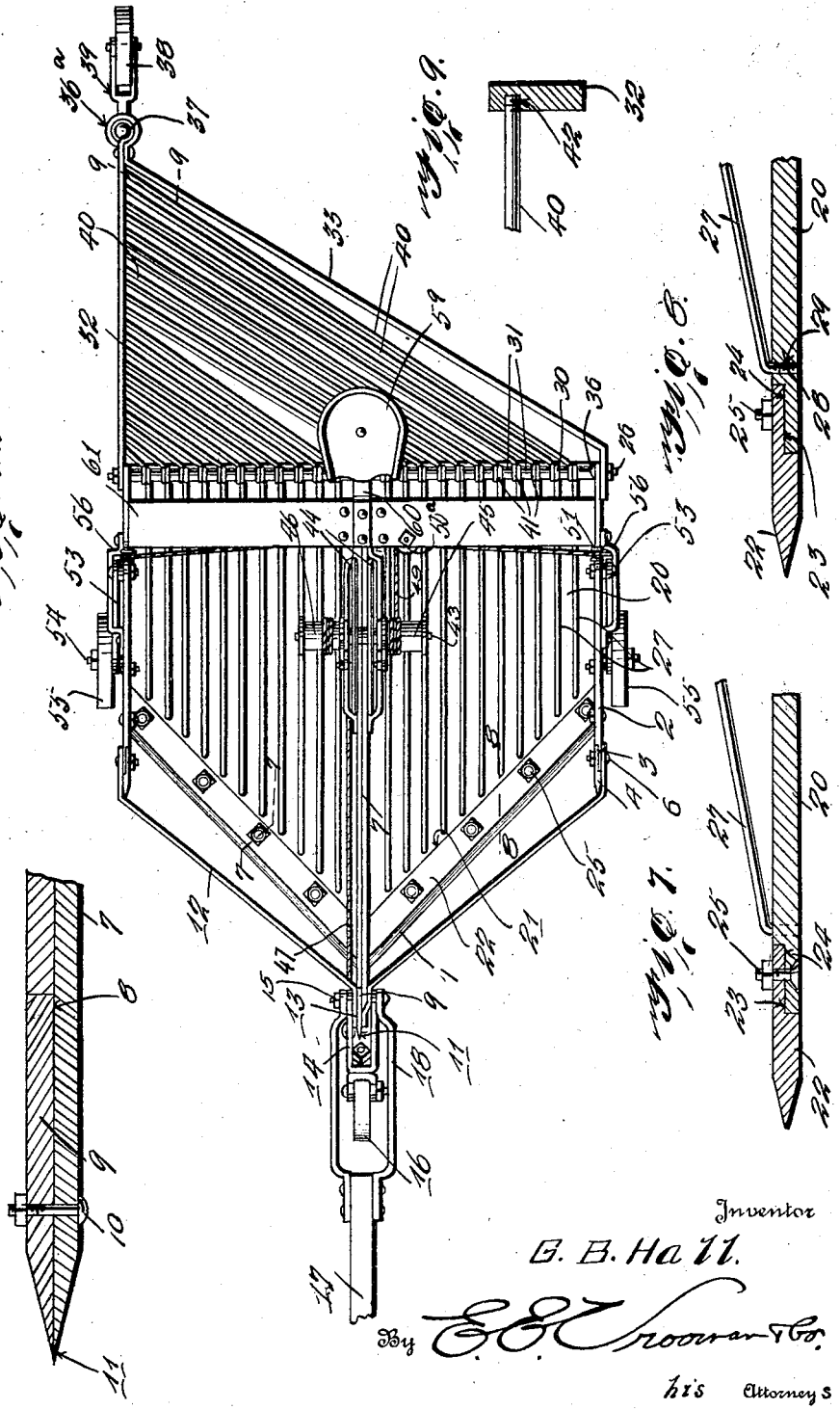

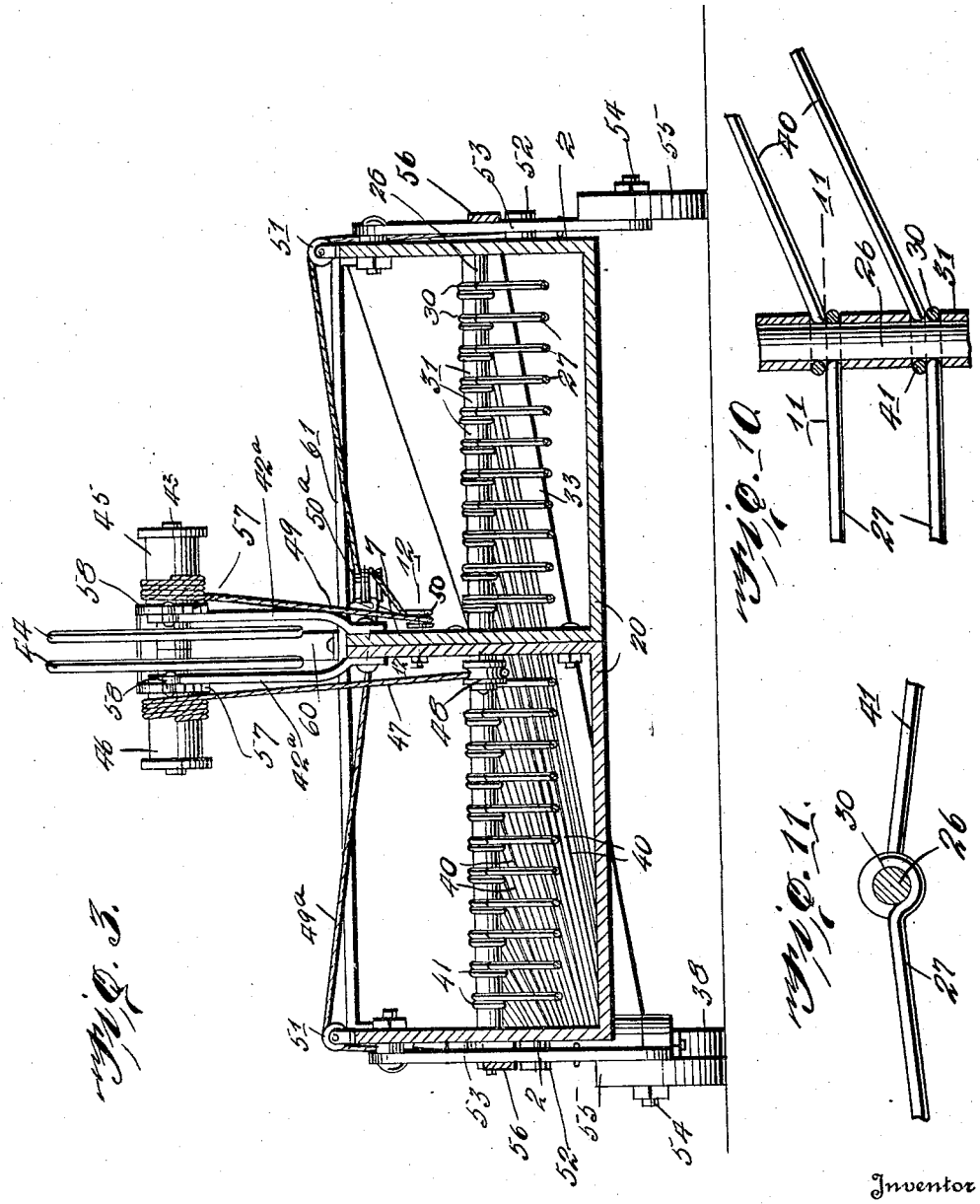

UNITED STATES PATENT OFFICE.

GEORGE BARTON HALL, OF HALL CITY, FLORIDA.

PALMETTO-PLOW.

1,283,746.  Specification of Letters Patent.  Patented Nov. 5, 1918.

Application filed January 4, 1918. Serial No. 210,286.

*To all whom it may concern:*

Be it known that I, GEORGE BARTON HALL, a citizen of the United States, residing at Hall City, in the county of De Soto and State of Florida, have invented certain new and useful Improvements in Palmetto-Plows, of which the following is a specification, reference being had therein to the accompanying drawings.

This invention relates to a palmetto plow which is sometimes called "a prairie grubber" and has for its object the production of a simple and efficient plow which will thoroughly and efficiently cut and plow the palmetto roots from the soil and lift the roots, allowing the soil to drop therefrom and deliver the roots to one side of the path of travel of the machine.

With this and other objects in view this invention consists of certain novel constructions, combinations, and arrangements of parts as will be hereinafter fully described and claimed.

In the drawings:—

Figure 1 is a side elevation of the plow.

Fig. 2 is a top plan view thereof.

Fig. 3 is a section taken on line 3—3 of Fig. 1.

Fig. 4 is a transverse section through one of the cable winding drums showing the ratchet coöperating therewith.

Fig. 5 is a section taken on line 5—5 of Fig. 1.

Fig. 6 is a section taken on line 6—6 of Fig. 1.

Fig. 7 is a section taken on line 7—7 of Fig. 2.

Fig. 8 is a section taken on line 8—8 of Fig. 2.

Fig. 9 is a section taken on line 9—9 of Fig. 2.

Fig. 10 is a longitudinal section through a portion of the inclined rod supporting member.

Fig. 11 is a section taken on line 11—11 of Fig. 10.

Fig. 12 is a section taken on line 12—12 of Fig. 3.

Fig. 13 is a horizontal section taken through the rear end of the main frame showing the connection between the main frame and the discharge or delivery frame.

Fig. 14 is a fragmentary view of my machine, showing the double pulleys under the seat-supporting bar.

By referring to the drawings it will be seen that 1 designates the main frame which is provided with a pair of side plates 2 which side plates are provided with cut-out portions 3 within which cut-out portions 3 are mounted the vertical cutting knives 4. These vertical cutting knives 4 are provided with curved outer cutting edges 5 and are firmly held within the sockets 3 by means of the bolts 6. The main frame 1 is also provided with a centrally located partition 7 formed of a pair of closely fitting plates and one of these plates constituting the partition 7 terminates short of the other plate for producing a pocket 8 in which pocket 8 fits the central cutting knife 9 which is firmly held within the pocket 8 by means of suitable bolts 10. The knife 9 is also provided with a curved outer face 11 constituting a sharpened cutting edge for cutting vertically through the soil through which the plow is passing.

The frame 1 is provided with a pair of converging upper rails 12 which rails are provided with forwardly extending feet 13 and are securely fastened to the upper end of the vertical cutting knife 9. A pair of hanger arms 14 are pivotally secured to the top of the knife 9 by means of a pivot pin 15 and these hanger arms 14 carry a forward caster wheel 16 which is adapted to support and guide the forward end of the plow while the same is traveling from place to place. A suitable draft tongue 17 is connected to a plurality of strap members 18 which strap members are pivotally secured at their rear ends 19 through the extending feet 13 of the converging upper rails 12, and to the central partition 7 as shown clearly in Fig. 1 of the drawing.

The body 1 is provided with bottom platforms 20 which platforms 20 are provided with inclined side edges 21 tapering toward the center of the body and cutting knives 22 are bolted (so that knives may be removed for sharpening) to the forward edges 21 of the bottoms or platforms 20 by having their cut-out rear faces 23 fitting upon the cut-out ledge portions 24 of the bottoms or platforms 20 as shown clearly in Fig. 7 of the drawings. Suitable securing bolts 25 pass through the knives 22 and through the bottom platforms 20 for firmly securing the knives 22 to the bottoms or platforms.

An inclined rod supporting member 26 is secured to the side plates 2 of the frame 1 above the rear end of the platforms or bottoms 20 as shown clearly in Fig. 3 of the drawings and a plurality of inclined rods 27 are secured to the bottoms 20 by having their depending ends 28 threaded into the sockets 29 formed in the bottoms or platforms 20. These rods extend rearwardly across the platforms 20 being upwardly inclined and have their eye-portions 30 fitting around the supporting rod 26. The inner ends of these rods are arranged in proper spaced relation by means of the spacing sleeves 31.

A discharge or delivery frame is secured to the rear of the frame 1 and comprises a longitudinally extending plate 32 and an angularly extending plate 33. Each of these plates 32 and 33 is pivotally secured to the frame 1 by means of a suitable bolt such as is indicated by the numeral 34 in Fig. 1 of the drawings the same being the threaded ends of the inclined rod supporting member 26. The upper end of each of the plates 32 and 33 is provided with an arch shaped groove 35 within which groove works a securing bolt 36 for permitting the other frame to swing upwardly at its rear end. The rear ends of the plates 32 and 33 are secured together for producing an eye 36a through which eye 36a passes a pivot bolt 37. This pivot bolt 37 supports a caster wheel 38 carried by the frame 39. The delivery frame supports a plurality of side rods 40 which rods are provided with eye-portions 41 fitting snugly over the supporting member 26. The inner ends of these rods 41 are threaded within the sockets 42 (Fig. 9) formed in the longitudinally extending plate or member 32. The rods 40 are adapted to extend downwardly at an incline from the supporting member 26 toward the plate 32 as is clearly shown in Fig. 1 of the drawings. Each of the rods 40 has the eye-portion 41 thereof extending at an angle to the rod 40 in order to permit the delivery rods 40 to extend at a proper angle for engaging the plate 32.

The central partition 7 carries a plurality of brackets 42a which brackets carry a shaft 43, the shaft 43 carrying a plurality of wheels 44. One of the wheels 44 is secured to a drum 45 and the other wheel 44 is secured to an opposite drum 46. A cable 47 passes around the drum 46 and over a guiding pulley 48 carried by the central partition 7 and is secured at its forward end to one of the hanger arms 14. The other drum 45 carries a cable 49 which cable 49 passes over a guiding pulley 50—this pulley 50 being similar to pulley 48,—and both pulleys 48 and 50 are carried by the partition; pulley 50 guiding cable 49 straight back toward seat supporting bar 61 under which is secured a double pulley 50a which pulley 50a guides the cables 49 and 49a in opposite directions over pulleys 51 carried by each of the side plates 2, the cables 49 and 49a then passing down over pulleys 52 and being secured to the rear wheel supporting arms 53.

The pulleys and cables are out of the way of roots that are being carried up the inclined rods. These arms 53 are mounted upon each side of the frame 1 and have outwardly-extending stub-axles 54, journaled upon which are rear wheels 55 as shown in Fig. 3 of the drawings. The rear wheel supporting arms 53 pass through suitable guiding brackets 56 carried by the frame 1.

Each of the drums 45 and 46 is provided with a ratchet 57 which is engaged by a gravity pawl 58 for normally preventing the rotation of the drums 45 and 46 in one direction.

A seat 59 is supported upon a spring 60 mounted upon the transversely extending seat supporting bar 61 as shown clearly in Figs. 2 and 3 of the drawings.

From the foregoing description it will be seen that a very simple and efficient means has been produced for thoroughly plowing the palmetto prairie lands of the Southeastern States (especially Florida) that are covered with a more or less rank growth of native palmetto, a fibrous root growth almost entirely along the surface of the ground and held in the ground by a tap root descending at right angles from the bud end of the main root and having a system of small fibrous lateral roots. On these prairies many other roots are also found which seriously retard the progress of a plow and by the use of the device above described, a very simple and efficient means has been produced for quickly and efficiently removing this objectionable growth from the soil and at the same time depositing this growth at such a point as to permit the same to readily dry and afterward become burned.

The operation of the present invention is as follows:—

When the plow is in the desired position to begin plowing, the operator will permit one of the wheels 44 to rotate so as to unwind the cable 47 and allow the wheel 16 to swing upwardly and outwardly and permit the forward end of the guiding knives 22 to engage the ground and dig into the same. The opposite wheel 44 will also be rotated to allow the wheels 55 to swing dropping the body 1 to follow into the ground to the desired working depth. As the plow continues to move forwardly, the knives 22 as well as the knives 4 and 9 will cut into the ground thereby cutting the roots at the desired depth from the surface and as the plow moves forwardly the roots and the underbrush will be carried rearwardly of the machine and upwardly upon the rods 27 and will then be moved downwardly toward the discharge ends of the rods 40 and deposited at one side of the machine. The machine is preferably attached to a traction engine or the like in any suitable or desired manner and while plowing the operator drives the plow around the field working from the outer edge thereof toward the center of the field. By means of the present device it will be seen that the roots may be deposited in wind-rows upon land over which the plow has passed and the roots may be left in this position until thoroughly dry when the roots may be burned.

When it is desired to move the plow to some point of operation the wheels 44 may be operated for winding the cables 47 and 49 upon their respective drums for raising the plow out of engagement with the soil and as soon as the plow has reached the desired point of operation, the operator may throw the dogs or pawls out of engagement with the ratchets 57 and allow the drums 45 and 46 to rotate for unwinding the cables 47 and 49.

What I claim is:—

1. A plow of the class described, comprising a body provided with a bottom platform, said platform provided with inclined forward edges converging toward the center of said body, a central partition, side plates secured to said body, a cutting knife carried by each side plate and carried by said central partition, and a plurality of conveying rods carried by said body.

2. A plow of the class described, comprising a body provided with a bottom platform, said platform provided with inclined forward edges converging toward the center of said body, a central partition, side plates secured to said body, a cutting knife carried by each side plate and carried by said central partition, and a plurality of conveying rods carried by said body, a side frame secured to said body and adapted to receive material therefrom and discharge material toward one side of said body.

3. A plow of the class described, comprising a body, a delivery frame pivotally secured to said body and comprising a longitudinally extending side plate and an angularly inclined side plate, said plates being secured together at their inner ends, said plates provided with arch-shaped slots near the top thereof, securing bolts carried by said body and passing through said arch-shaped slots for permitting the adjustment of said delivery frame at said top and delivery rods carried by said body and delivery frame.

4. A plow of the class described, comprising a body, a delivery frame, a rod supporting member carried by said body, said body provided with a bottom platform, inclined rods secured to said bottom platform and extending upwardly at an angle and provided with eyes winding around said rod securing member, the delivery frame comprising a plurality of converging plates, and said rods secured to said rod securing member and having their ends threaded into one of said plates of said delivery frame and means for supporting the rear end of said delivery frame.

In testimony whereof I hereunto affix my full name.

GEORGE BARTON HALL.

Copies of this patent may be obtained for five cents each, by addressing the "Commissioner of Patents, Washington, D. C."